US009665773B2

(12) United States Patent
Zomet et al.

(10) Patent No.: US 9,665,773 B2
(45) Date of Patent: May 30, 2017

(54) SEARCHING FOR EVENTS BY ATTENDANTS

(75) Inventors: Asaf Zomet, Jerusalem (IL); Ehud Rivlin, Palo Alto, CA (US); Gal Chechik, Los Altos, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/532,468

(22) Filed: Jun. 25, 2012

(65) Prior Publication Data
US 2013/0343618 A1 Dec. 26, 2013

(51) Int. Cl.
*G06K 9/00* (2006.01)
(52) U.S. Cl.
CPC .................... *G06K 9/00677* (2013.01)
(58) Field of Classification Search
CPC G06K 9/00677; G06K 9/00684; G06F 17/30; G06F 17/30038; G06F 17/30041; G06F 17/30047; G06F 17/301; G06F 17/30112
See application file for complete search history.

(56) References Cited

U.S. PATENT DOCUMENTS

| 6,629,104 | B1* | 9/2003 | Parulski ............ G06F 17/30265 348/231.2 |
| 7,756,866 | B2* | 7/2010 | Bhalotia ............ G06F 17/30265 707/723 |
| 7,945,653 | B2* | 5/2011 | Zuckerberg et al. ......... 709/223 |
| 2003/0033296 | A1* | 2/2003 | Rothmuller ....... G06F 17/30017 |
| 2003/0063771 | A1* | 4/2003 | Morris .............. G06F 17/30206 382/100 |
| 2003/0161499 | A1* | 8/2003 | Svendsen ........... H04N 1/00244 382/102 |
| 2004/0126038 | A1* | 7/2004 | Aublant et al. ............... 382/305 |
| 2005/0246324 | A1* | 11/2005 | Paalasmaa et al. ............... 707/3 |
| 2006/0056737 | A1* | 3/2006 | Ohtsuka et al. ............... 382/305 |
| 2006/0184574 | A1* | 8/2006 | Wu .................... G06F 17/30265 |
| 2006/0259511 | A1* | 11/2006 | Boerries ........... G06F 17/30064 |

(Continued)

FOREIGN PATENT DOCUMENTS

WO WO2009070841 6/2009

OTHER PUBLICATIONS

Morris, Meredith Ringel, Andreas Paepcke, and Terry Winograd. "Teamsearch: Comparing techniques for co-present collaborative search of digital media." Horizontal Interactive Human-Computer Systems, 2006. TableTop 2006. First IEEE International Workshop on. IEEE, 2006.*

(Continued)

*Primary Examiner* — Siamak Harandi
*Assistant Examiner* — Carol Wang
(74) *Attorney, Agent, or Firm* — Patent Law Works LLP

(57) ABSTRACT

A system, computer-implemented method and non-transitory computer-readable medium for automatically searching for images from events is provided. One or more personal identity tags are provided, wherein the personal identity tags relate to identification information for one or more individuals. Next, at least one event group is identified, wherein the event group is a collection of images associated with an event, the collection of images including one or more images tagged with one or more of the provided personal identity tags. A collection of the images for each of the identified event groups is then received.

24 Claims, 5 Drawing Sheets

(56) References Cited

U.S. PATENT DOCUMENTS

| | | | |
|---|---|---|---|
| 2007/0043748 A1* | 2/2007 | Bhalotia | G06F 17/30265 |
| 2007/0098303 A1* | 5/2007 | Gallagher et al. | 382/305 |
| 2007/0282908 A1* | 12/2007 | Van der Meulen | G06Q 10/06 |
| 2008/0085053 A1* | 4/2008 | Cerosaletti | G06F 17/30247 |
| | | | 382/190 |
| 2008/0120310 A1* | 5/2008 | Khoury | G06F 17/30038 |
| 2008/0201734 A1* | 8/2008 | Lyon | G06Q 30/0251 |
| | | | 725/34 |
| 2008/0243802 A1* | 10/2008 | Han | G06F 17/30038 |
| 2008/0298766 A1 | 12/2008 | Wen et al. | |
| 2009/0144560 A1* | 6/2009 | Takenaka | G06F 17/30265 |
| | | | 713/189 |
| 2009/0148071 A1* | 6/2009 | Ohwa et al. | 382/306 |
| 2009/0252383 A1* | 10/2009 | Adam et al. | 382/118 |
| 2009/0319472 A1* | 12/2009 | Jain et al. | 707/2 |
| 2010/0082653 A1* | 4/2010 | Nair | 707/759 |
| 2010/0114933 A1* | 5/2010 | Murdock | G06F 17/30265 |
| | | | 707/765 |
| 2010/0277611 A1* | 11/2010 | Holt et al. | 348/231.2 |
| 2011/0099199 A1* | 4/2011 | Stalenhoef et al. | 707/770 |
| 2011/0176737 A1* | 7/2011 | Mass | G06F 17/30265 |
| | | | 382/220 |
| 2011/0235858 A1* | 9/2011 | Hanson | G06K 9/6218 |
| | | | 382/103 |
| 2012/0027256 A1 | 2/2012 | Kiyohara et al. | |
| 2012/0054039 A1 | 3/2012 | Patwa et al. | |

OTHER PUBLICATIONS

International Search Report and Written Opinion, mailed Mar. 7, 2014, for PCT/US2013/047611 (11 pages).
Extended European Search Report for PCT/US 2013047611, mailed on Mar. 31, 2016, 5 pages.

* cited by examiner

SEARCHING FOR EVENTS BY ATTENDANTS

TECHNICAL FIELD

This disclosure relates generally to the field of digital media and more particularly to the searching for images based on events.

BACKGROUND

The sharing of digital media typically involves a user uploading media to a media sharing web site such as, for example, Picasa and Picasa Web Albums, using a browser or other application running on the user's computing device. The media is stored at a remote web server operated by the web site and later accessed by other users, with whom the user has chosen to share the media. However, as the amount of digital media and digital media collections grows, searching for media data related to a specific events can become difficult.

BRIEF SUMMARY

Embodiments relate to searching for images relating to an event. In one embodiment, one or more personal identity tags are provided from a client device, wherein the personal identity tags relate to identification information for one or more individuals. Next, at least one event group is identified. The event group is a collection of images associated with an event. The collection of images includes one or more images tagged with one or more of the provided personal identity tags. A collection of the media data for each of the identified event groups is then received by the client device.

In another embodiment, a system for searching for images relating to an event is provided. In an embodiment a system is provided comprising one or more processors and one or more storage devices storing instructions that are operable, when executed by the one or more processors, to cause the one or more processors to perform operations comprising, providing one or more personal identity tags, wherein the personal identity tags relate to identification information for one or more individuals. Next, at least one event group is identified. The event group is a collection of images associated with an event, the collection of images including one or more images tagged with one or more of the provided personal identity tags. A collection of the images for each of the identified event groups is then received.

In another embodiment, a non-transitory computer-readable medium storing software comprising instructions executable by one or more processors which, upon execution, cause the one or more processors to perform operations. These operations include providing one or more personal identity data tags, identifying at least one event group, wherein the event group is a collection of images associated with an event, and receiving access to the collection of images for each of the identified event groups.

Further embodiments, features, and advantages, as well as the structure and operation of the various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of the present disclosure and, together with the description, further serve to explain the principles of the disclosure and to enable a person skilled in the relevant art(s) to make and use embodiments thereof.

DETAILED DESCRIPTION

Overview

Figure 1:
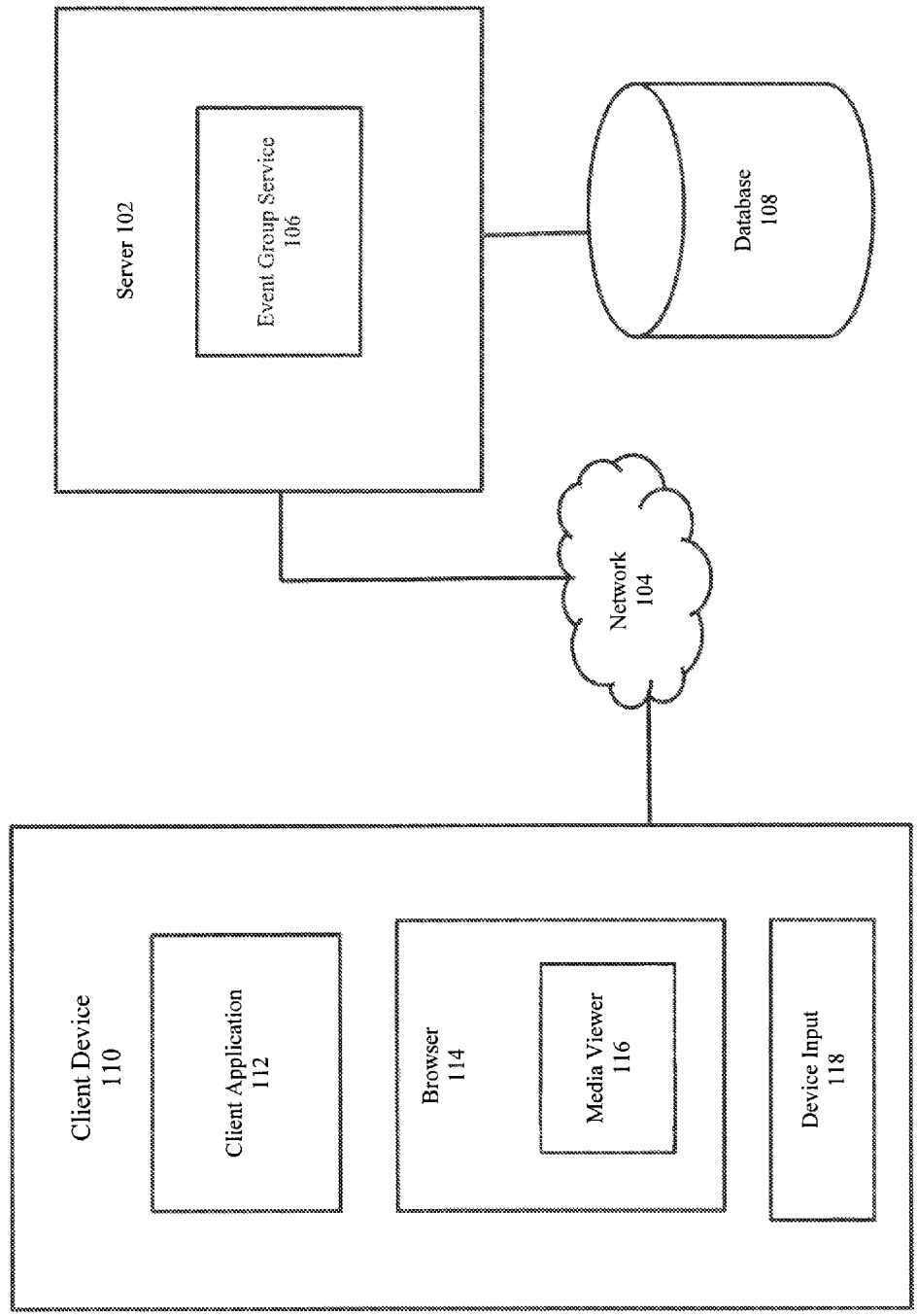
FIG. 1 is a diagram of an exemplary system in which embodiments may be implemented.

To facilitate the searching and sharing of images, users can organize digital media collections into different folders by album name or by date. Users can also associate tags or tag words with an image or group of images. Tags include one or more keywords that describe the content of the image. However, searching for images related to a specific event can become a time-intensive task when a limited amount of information is known by the user. For example, a user may attend an event and want to see images taken at that event. In such a scenario, the user may only know the names of one or two individuals that attended the event, along with the location of the event. Provided a database with a significant amount of images, a user would manually have to go through each image or album searching for images from the event.

In addition, media sharing sites generally do not provide the capability to automatically search for images related to a specific event. For example, a user may attend an event and know a few other individuals who attended the event, however, there is no automatic way of retrieving photos from that event. Generally, a user would have to know another individual who took images at the event and search that individual's albums for the images.

Embodiments relate to automatically searching for images based on events. Embodiments provide one or more personal identity tags from a client device. The personal identity tags relate to identification information for one or more individuals. At least one event group is identified, wherein the event group is a collection of images associated with an event. The collection of images includes one or more images tagged with one or more of the provided personal identity tags. A collection of the images for each of the identified event groups is then received.

For example, a user may be presented with an option to search for images from an event. The user may be provided with one or more input fields which allow them to enter the names of individuals who attended the event. Once the names of the individuals are provided, a database residing on a server is searched for matching event groups. A matching event group will include images which are tagged with the same or substantially similar personal identity tags. The collection of images associated with the event group is then received by the user. The user may then view the images based on the event. Embodiments also enable events to be retrieved by providing geo-location data, time, or landmark information.

While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "media" and "digital media" are used interchangeably herein to refer broadly and inclusively to digital photographs, or digital photos, and digital video. The term "image" is used herein to refer broadly and inclusively to a digital photograph depicting an image of a scene and items within that scene, including, but not limited to, one or more persons, one or more landmarks, and/or one or more objects. In addition, the term "image(s)" may refer to one or more frames from at least a portion of a digital video. Furthermore, the terms "photograph/photo," "video," "media," and "image" are used herein to refer to digital photos and digital video whether or not the terms are modified by the term "digital."

The term "media sharing site" is used herein to refer broadly and inclusively to any web site, service, framework, or protocol adapted to share digital media, including photos and videos, between various users. Such a web site or service may also include social networking sites with the added capability to share media between members of the site.

System

FIG. 1 is a diagram illustrating an event search system 100 in which embodiments described herein can be implemented. System 100 includes client device 110, a client application 112, a browser 114, a media viewer 116, a device input 118, a network 104, a server 102, an event group sharing service 106, and a database 108.

In an embodiment, client device 110 executes client application 112. In a further embodiment, client device 110 executes media viewer 116. The operation of client application 112 and media viewer 116 are described in further detail below. Client application 112, browser 114, and media viewer 116 may be implemented on any type of computing device. Such computing device can include, but is not limited to, a personal computer, mobile device such as a mobile phone, tablet device, laptop computer, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

In general event search system 100 operates as follows. Client device 110, via client application 112, media viewer 116, or any combination thereof, may provide one or more personal identity tags to event group sharing service 106 on server 102. A personal identity data tag relates to identification information for one or more individuals. For example, a personal identity tag could be a first name, last name or nickname of an individual. In general, a personal identity tag will be provided by a user who is looking for images for a specific event. In this scenario, a user may provide personal identity tags for one or more individuals that attended the specific event, such as a wedding. The one or more individuals that attended the event may be referred to as attendants.

Additionally, one or more event-specific data tags may be provided, according to an embodiment. The event-specific data tags may be geo-location data, time data or landmark identification data relating to the event. For example, a user may provide geo-location data such as the name or address of an event venue. Additionally, a user may provide information such as the date and time an event took place or specific landmarks which may appear in the images. The one or more personal identity tags and/or the one or more event-specific data tags may be entered and provided to event group sharing service 106 using device input 118 on client device 110. In the example above, a user may provide one or more event-specific data tags, such as the address or date of the wedding. Device input 118 may be any kind of user input device coupled to client device 110 including, but not limited to, a mouse, QWERTY keyboard, touch-screen, microphone, or a T9 keyboard.

In response to providing the one or more personal identity tags and/or event-specific data tags, at least one event group is identified. An event group is a collection of images associated with an event. The collection of images may include one or more images tagged with the one or more provided personal identity data tags and/or event-specific data tags. Event group sharing service 106 on server 102 receives the personal identity tags and/or event-specific data tags. At least one event group is identified by searching through database 108 for images which are grouped together and tagged with personal identity tags and/or event-specific data tags which match the tags provided by the user. For example, a user may provide personal identity tags "Jane Doe" and "John Doe" along with event-specific geo-location data tag "Venue X." The user has indicated that he is looking for images from an event (e.g. a wedding) that Jane Doe and John Doe attended at Venue X. Upon receipt of the personal identity tags and the event-specific data tags, database 108 is searched for a group of images that are tagged with the provided tag information.

The images are stored within database 108 as event groups. As stated previously, event groups are a collection of images that are associated with an event. Event group sharing service 106 is configured to receive and store images based on events. The storing of images based on events is performed by event group sharing service 106 using techniques known to those skilled in the art. For example, upon receipt of images, event group sharing service 106 may perform a face detection operation for each image using well-known face detection algorithms. Additionally, a facial recognition operation may be performed on each image using well-known facial recognition algorithms. Once the facial detection and facial recognition operations are performed, the images are clustered together into event groups using clustering algorithms known to those skilled in the art. Further discussion of event group sharing service 106 and its operations will be discussed below.

The collection of images from the identified event groups are received by client device 110. In an embodiment, as illustrated in FIG. 1, client device 110, via client application 112, media viewer 116, or any combination thereof, may receive and display images received from event group sharing service 106 on server 102. Images include one or more media files. The media files may be photos, video, or a combination of both. In addition, the media files may include media content information and metadata corresponding to the media to be retrieved or displayed. Client application 112 and media viewer 116 may present a visual representation of the retrieved image on a display of client device 110. Such a display can be any type of display for viewing digital photos and/or video or can be any type of rendering device adapted to view digital photos and/or video.

In an embodiment, media viewer 116 can be a standalone application, or it can be executed within a browser 114, such as, for example, Google Chrome. Media viewer 116, for example, can be executed as a script within browser 116, as a plug-in within browser 116, or as a program, which executes within a browser plug-in.

In an embodiment, client device 110 is configured to receive notifications from event group service 106 over network 104. In an embodiment, such notifications can include an access link to a location on the web where the image to be viewed is stored. For example, the access link may include a location to a web site in the form of a web location address such as a uniform resource locator (URL). Notifications may be sent from event group service 106 to client device 110 using any of a number of different protocols and methods. For example, notifications may be sent from event group service 106 via electronic mail or Short Message Service (SMS). Notifications may be received at client device 110 by client application 112, media viewer 116, or any other application or utility adapted to receive such notifications, such as, for example, an electronic mail client or SMS application.

Client device 110 communicates with server 102, for example, across network 104. Although only server 102 is shown, more servers may be used as necessary. Similarly, although only client device 110 is shown, more client devices may be used as necessary. Client device 110 is communicatively coupled to network 104 through a communications interface. Client device 110 can be any type of computing device having one or more processors and a communications infrastructure capable of receiving and transmitting data over a network. Client device 110 can include, but is not limited to, a mobile phone, a personal digital assistant (PDA), a computer, a cluster of computers, a set-top box, or other similar type of device capable of processing instructions and receiving and transmitting data to and from humans and other computing devices.

Server 102 similarly, can be any type of computing device capable of serving data to client device 110. Server 102 executes event grouping service 106. Although event grouping service 106 is shown with respect to server 102, event image service 102 may be implemented on any server. Furthermore, the functionality of event grouping service 102 may be implemented on a single server, such as, for example, server 102, or across multiple servers, in a distributed or clustered server environment.

In an embodiment, server 102 is communicatively coupled to database 108. Database 108 may be any type of data storage known to those of skill in the art. Database 108 may store any type of media and any corresponding media data accessible by server 102. Although only database 108 is shown, more databases may be used as necessary.

Database 108 may store any type of media data such as photograph or video data. The images may, for example, be photographs taken from a digital camera. The images may be encoded in JPEG, TIFF, or other similar format for digital image files. Each image may have metadata associated with the image. For example, an image may have an exchangeable image file format (EXIF) header that stores information such as a time when the photograph of the image was taken, a location where the photo was taken, and information about the individuals and/or landmarks appearing in the image. The time the image was taken may correspond to the time in which the image was exposed by an image capturing device. A video includes a sequence of frames, and each frame includes an image. The video may also be captured using an image capturing device able to capture video, such as, for example, a digital camera.

Network 104 can be any network or combination of networks that can carry data communication. Such network 104 can include, but is not limited to, a wired (e.g., Ethernet) or a wireless (e.g., Wi-Fi and 3G) network. In addition, network 104 can include, but is not limited to, a local area network, medium area network, and/or wide area network such as the Internet. Network 104 can support protocols and technology including, but not limited to, Internet or World Wide Web protocols and/or services. Intermediate network routers, gateways, or servers may be provided between components of system 100 depending upon a particular application or environment.

Client Application

Figure 2:
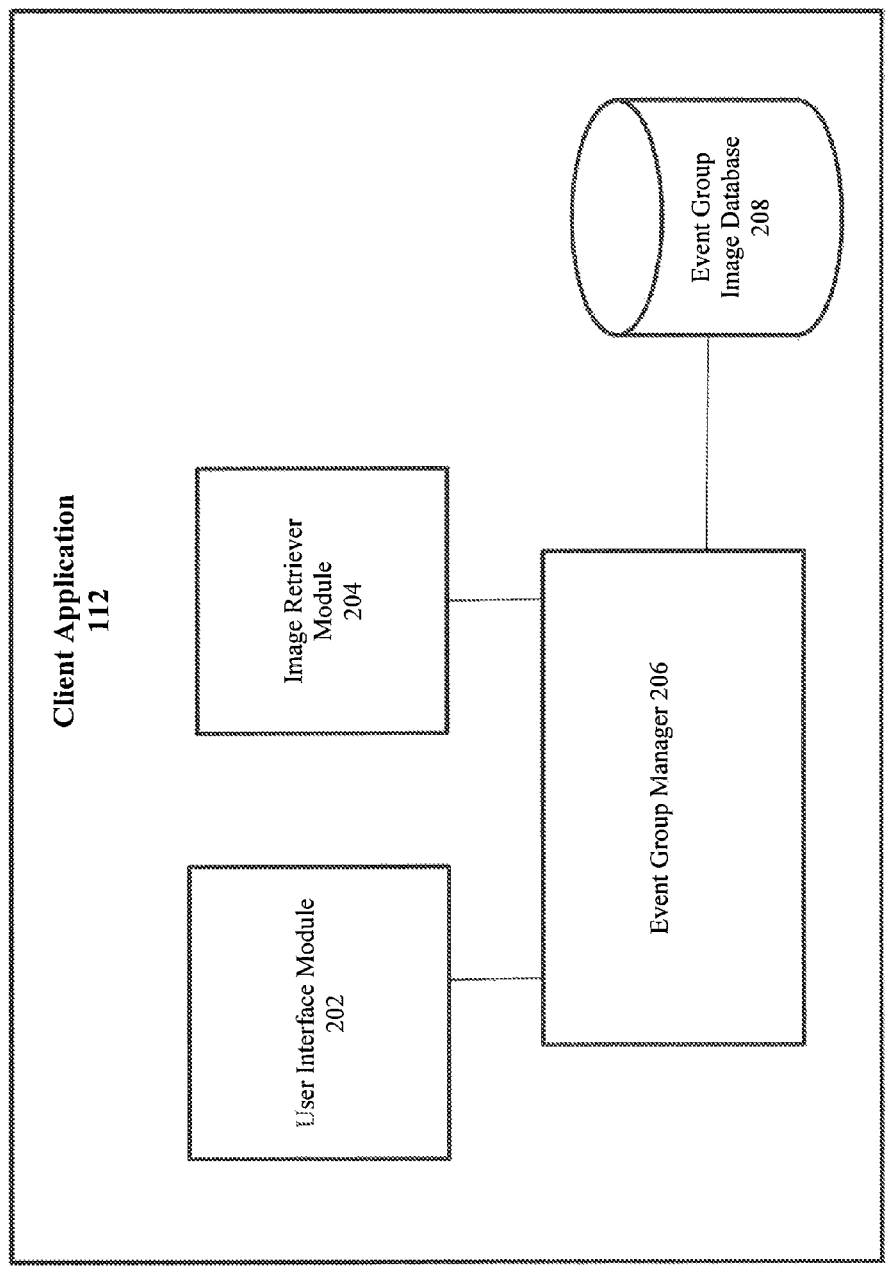
FIG. 2 is a diagram of an example of a client application in accordance with an embodiment.

FIG. 2 is a diagram illustrating an exemplary embodiment of client application 112 of client device 110 of FIG. 1. Client application 112 includes user interface module 202, image retriever module 204, event group manager 206. An event group image database 208 is coupled to client application 112. Each of the components of client application 112, including image retriever module 202, user interface module 204, and event group manager 206 may be communicatively coupled to one another.

In operation, client application 112 uses user interface module 204 to display an option to a user at client device 110 to request one or more event groups. Upon the user's selection of the option, client application 112 uses image retriever module 204 to receive the digital photo or video. User interface module 202 may display an option to the user to provide one or more personal identity tags. Additionally, user interface module 202 may display an option to the user to provide one or more event-specific data tags, according to an embodiment. For example, a user may be presented with one or more input fields to provide one of a first name, last name, nickname or location. The user will be searching for images from one or more events that took place at the provided location and in which the provided individuals attended. Additionally, user interface module 202 may provide a search input box. The search input box may allow a user to input a string of characters related to an event. For example, a user may input a string, "Event with John Doe and Erica Smith." This query will indicate that the user is searching for images from an event which John Doe and Erica Smith attended.

In response to providing the one or more personal identity tags and/or one more event-specific data tags, at least one event group is identified by image retriever module 204. The event group is a collection of images that are tagged with the same or substantially similar personal identity tags and/or event-specific tags. Image retriever module 204 is configured to receive the collection of images for each of the identified event groups. In another embodiment, event group manager 206 is configured to receive notifications (e.g., from event group service 106 of FIG. 1) of the one or more identified event groups. In an embodiment, the notification includes an access link to the event group. For example, the access link may be a web-based location address in the form of a uniform resource locator (URL) address, which users can select to be automatically directed to the event group. Referring back to FIG. 1, the images of the event group may be accessible, for example, via client application 112, media viewer 118, or a similar type of application the user can use to view media. Upon accessing the link, the user will have the ability to see all the images from each identified event group.

Alternatively, an option to download the one or more images may be provided to the user, according to an embodiment. For example, image retriever module may receive a notification of an identified event group along with an option to download the images associated with the identified event group. Upon a user selecting the option to download the images, all of the images within the event group will be received by client device 110 via network 104. Event group manager 206 is configured to divide the collection of images into albums based on the identified event group, according to an embodiment. Event group manager 206 divides the collection of images received by image retriever module 204 by grouping the collection of images into one or more albums based on the event group.

Event group manager 206 determines the metadata corresponding to each event group. Based on the determined metadata of each event group, event group manager 206 divides the collection of images into one or more albums. For example, an event group may include metadata such as a list of personal identities of individuals appearing in the collection of images along with a time range and location of when and where the collection of images were captured. Based on the metadata, event group manager 206 divides the collection or group of images into one or more albums in which each album contains images having substantially similar personal identity, time and location information.

Event group manager 206 is configured to store the one of more albums for each event group in an event group image database 208, according to an embodiment. In another embodiment, event group manager 206 may search event group image database 208 for existing albums containing images with similar metadata. For example, event group manager 206 may find an existing album in event group image database containing images having a similar personal identity list, time and location information as the image(s) received by image retriever module 204. In this example, event group manager 206 would add the image(s) to the existing album.

Event Group Service

Figure 3:
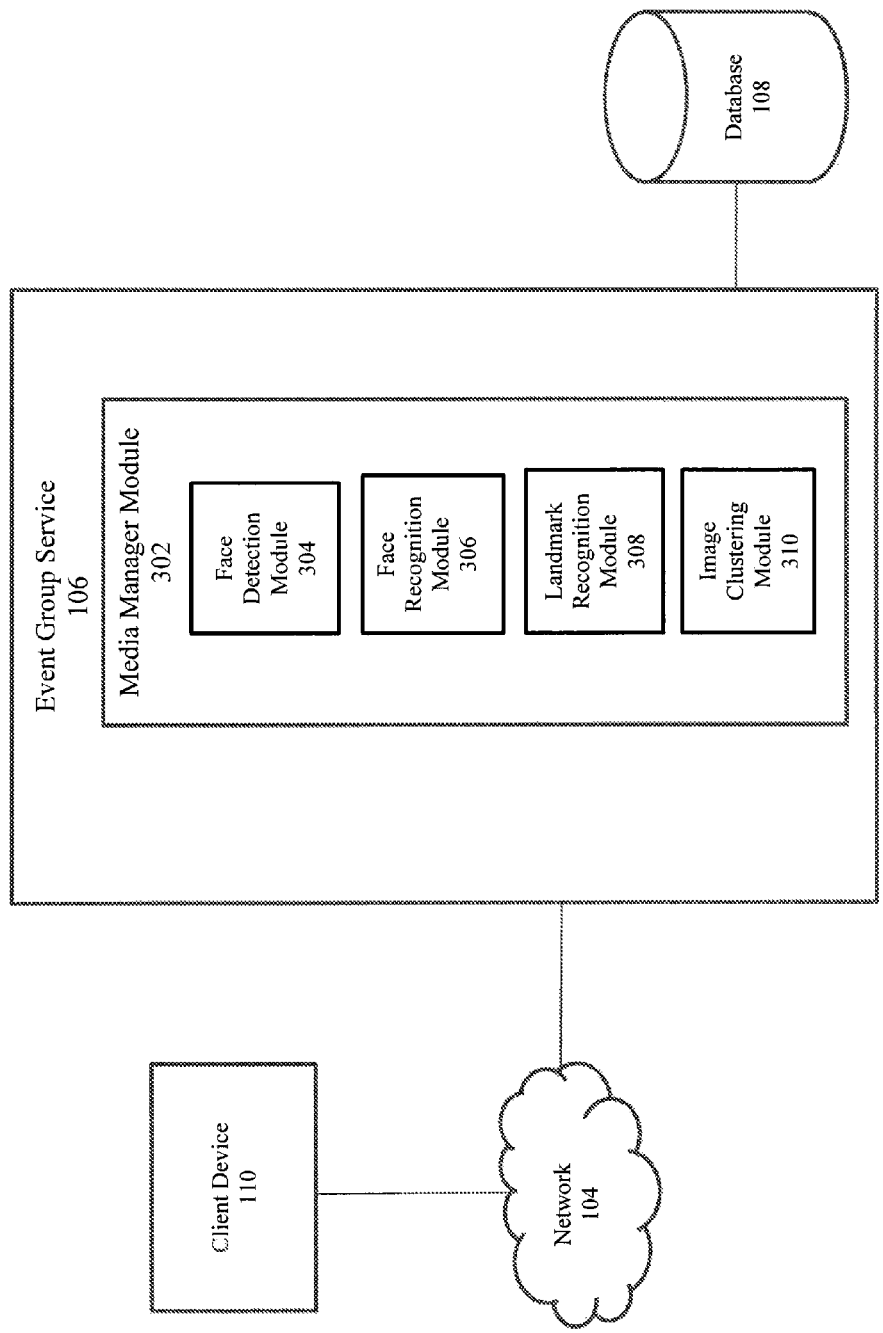
FIG. 3 is a diagram of an example of a system in which an event group service may be implemented in accordance with an embodiment.

FIG. 3 is a diagram illustrating an exemplary embodiment of event group service 106 of server 102 of FIG. 1. Event group service 106 includes media manager module 302, face detection module 304, face recognition module 306, landmark recognition module 308, and image clustering module 308. Event group service 106 groups images into event groups using processing known to those skilled in the relevant art. For example, images associated the same event can be grouped in the same group.

Face detection module 304 can be configured to analyze media after it is received by a client device. Face detection module 304 can be configured to analyze one or more provided images, to detect faces within the image(s). For example, if a set of images is provided to server 102, face detection module 304 can analyze each image in that set of images to detect faces.

When a face is detected, face detection module 304 can make a digital copy of an area encompassing the detected face, for example, a rectangular area encompassing the detected face, to produce a facial image or facial model corresponding to the detected face. The facial image can then be stored in a local memory (not shown). Alternatively, the facial image can be stored in database 108, which is accessible by client application 112 via a network (e.g., network 104). Face detection module 304 can use stored facial images to aid in detecting faces in subsequently analyzed images.

A person skilled in the relevant art given this description would appreciate that any one of several well-known techniques may be used in face detection module 304 to detect faces in images. Examples of such techniques include, but are not limited to, filtering feature values as described in U.S. Pat. No. 7,031,499 and face detection using boosted primitive features as described in U.S. Pat. No. 7,099,510.

Face recognition module 306 interprets the images by performing automatic face recognition to recognize one or more faces. The automatic face recognition of face recognition module 306 may function in two stages: a face detection stage and a face recognition stage. However, face recognition module 306 may be able to skip the face detection stage if face detection information is already included with the images. For example, the image may have been sent by a client application including the face detection information. Face recognition module 306 analyzes the images to detect faces within the images. When one or more faces are detected, face recognition module 332 may generate face detection information corresponding to each detected face including, for example, a bounded region encompassing the detected face within the image.

The operation of face recognition module 306 may include making comparisons of detected faces against one or more of facial images that have been previously recognized. For example, the previously recognized faces may be stored in one or more facial image databases (not shown) accessible by face recognition module 306. A person skilled in the relevant art given this description would appreciate that any one of several well-known techniques may be used in face recognition module 306 to recognize faces in images. Examples of such techniques include, but are not limited to, the face recognition algorithm as described in U.S. application Ser. No. 12/416,632.

Landmark recognition module 308 detects portions of images that have a landmark and identifies the landmark. One example of landmark recognition module 308 is described in commonly owned U.S. patent application Ser. No. 12/119,359 entitled "Automatic Discovery of Popular Landmarks," incorporated by reference herein in its entirety. Landmark recognition module 308 may, for example, use visual clustering to recognize landmarks.

Image clustering module 310 uses the information from face detection module 304, face recognition module 306 and landmark recognition module 308 to group images into event groups. For instance, image clustering module 310 may represent each image as a node in a graph. The edges between the nodes in the graph can be defined according to a weighted similarity function. For example, the similarity function may be based on techniques known to a person skilled in the relevant art, such as visual appearance features in the images including histograms of color, gradients, and linear binary patterns. Additionally, the similarity function may be based on color and texture visterms as described in Quelhas et al., "Modeling scenes with local descriptors and latent aspects," In Proceedings of IEEE International Conference on Computer Vision (ICCV), 2005, or by scale invariant feature transforms, as described in Lowe, D., "Distinctive image features from scale-invariant keypoints," International Journal of Computer Vision, 60, 2 (2004), pp. 91-110.

Each feature may be translated into a similarity function by applying a monotonic decreasing function such as $f(x)=1/(|x|+1)$, where x represents the feature. Alternatively, the similarity function may be based on a monotonic decreasing function of the capture time difference and GPS location distance between the images. For example, if a capture time and/or GPS information is available for a set of images, then edges may be defined only for those images that have a sufficiently small time and place difference, such as 1 week or 100 km. Additionally, the similarity function may be based on a monotonic decreasing function of the number of faces identified and recognized which are shared between the images.

The weighting of the similarity function and subsequent clustering of the images into event groups may be performed by sampling image triplets. For example, images A, B, and C may be sampled, where image A and image B belong to the same event and image C belongs to another event. This produces an in-equality constraint of the type Sim (A, B)>Sim (A, C). Additionally, margin learning may be applied to learn from the in-equality constraints as described in Chechik et al., "Large Scale Online Learning of Image Similarity Through Ranking," Journal of Machine Learning Research, 11:1109-1135, 2010. Image clustering module 310 may then perform a graph based clustering of the images into event groups using techniques similar to those described in Gdalyahu et al., "Self-Organization in Vision: Stochastic Clustering for Image Segmentation, Perceptual Grouping, and Image Database Organization," IEEE Trans. Pattern Analysis and Machine Intelligence, vol. 23, no. 10, pp. 1053-1074, October 2001.

Media manager module 302 may also associate with each event group, a personal identity list or other metadata. For example, the personal identity tags and/or event-specific data tags from for each image within an event group may be retrieved and used to populate a face identity list or geo-location data list. Each event group may have an associated face identity list or geo-location data list. Once a personal identity tag and/or geo-location data tag is provided by a user utilizing client application 112, the face identity list or geo-location data list for each event group is used to identify a matching event group.

In an example, event group service may be coupled to a media sharing site (not shown), such as Picasa. A user may upload the media from the media sharing site to database 108. For example, referring back to FIG. 1, the user may use browser 114 at client device 110 to navigate to the media sharing site and upload images to database 108 via a user interface provided by the media sharing site. In a further example, the user may also be able to retrieve images from database 108. For example, the user may have a choice to either download images onto client 110 for storage in local memory 116 or view the images using client application 112 or media viewer 116.

Method

Figure 4:
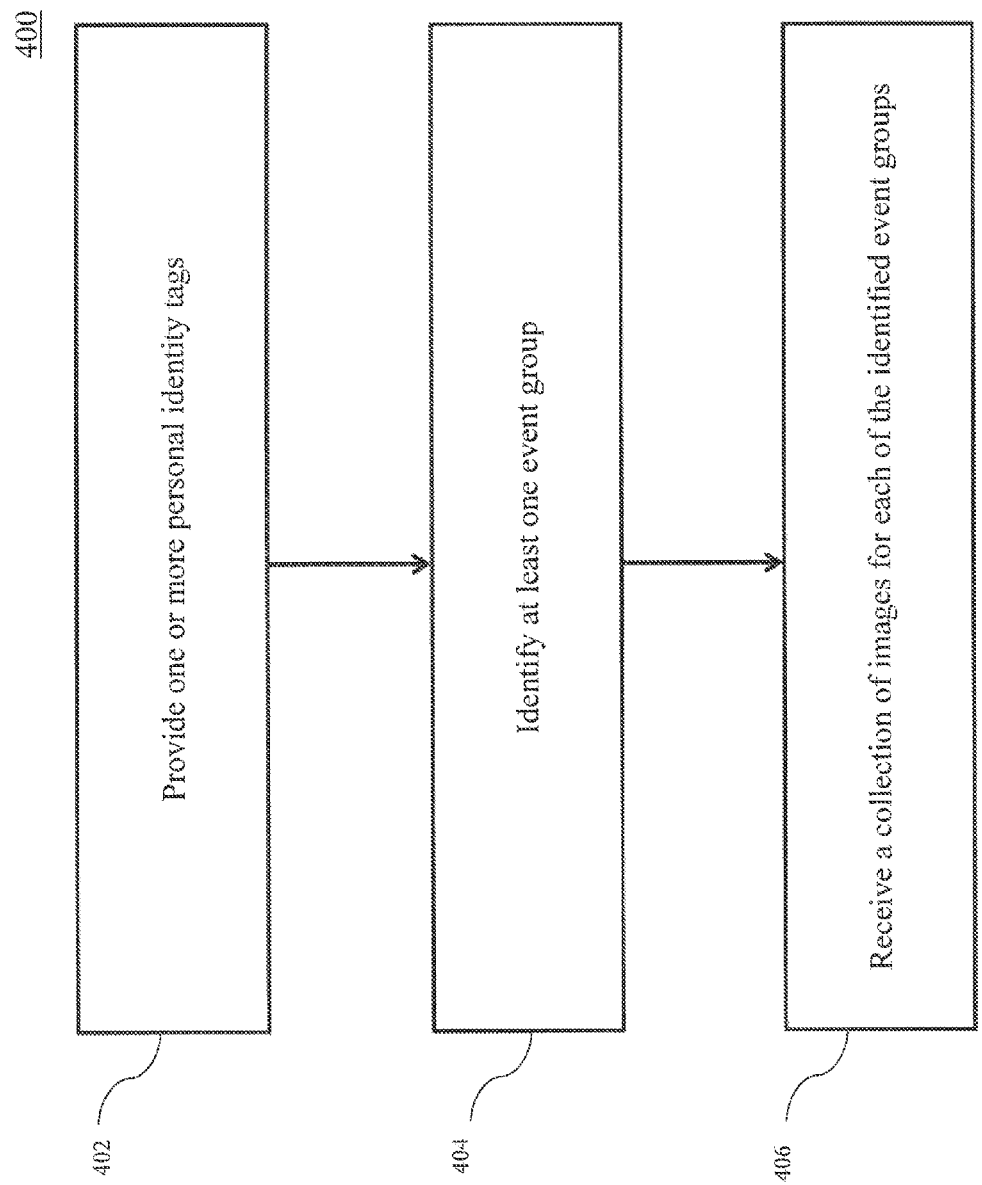
FIG. 4 is a flowchart of an example of a method for searching for images for an event.

FIG. 4 is a flowchart of an example of a method for searching for images for events. Benefits of method 400 include, but are not limited to, a faster, more efficient, and automated way for users to retrieve images based on events. Moreover, method 400 alleviates the burden for users of having to manually search albums or collections of images for those images related to a specific event.

In stage 402, one or more personal identity tags are provided. For example, the one or more personal identity tags may be provided by client application 112 and/or media viewer 116 on client device 110. The one or more personal identity tags relate to identification information for one or more images. In an embodiment, a personal identity tag may be one of a first name, last name or nickname of an individual. According to an embodiment, one or more event-specific data tags may be provided. The one or more event-specific data tags may relate to the location or time of an event. For example, a user may have attended an event such as a wedding, party or sporting event. At the event, there may be many people who are taking photographs. The user may want a convenient way to find images that were taken at the event from various people who they know where at the event and may appear in the photographs. As a result, the user may provide the following personal identity tags: "John Doe," "Jane Doe," "Venue X," "John Doe," and "Jane Doe" represent two individuals that attended the event in question and "Venue X" represents the location that the event took place. By providing the personal identity tags, the user intends on finding one or more images from the event in question that may include John Doe and Jane Doe.

In stage 404, at least one event group is identified. For example, the event group may be identified by client application 112 and/or media viewer 116 on client device 110. An event group is a collection of images associated with an event. The collection of images is tagged with one or more provided personal identity tags and/or event-specific data tags. In response, to providing the one or more personal identity tags and/or event-specific data tags, an event group which includes images with matching tags is identified. In the previous example, an event group including images that include John Doe and Jane Doe at venue X will be identified. The event group may include images that have both John Doe and Jane Doe, only John Doe, or only Jane Doe. Additionally, there may be more than one event group. For example, John Doe and Jane Doe may have attended multiple events at venue X. Thus, each event will have its own associated event group.

In stage 406, the collection of images for each of the identified event groups is received. For example, the collection of images for each of the identified event groups may be received by client application 112 and/or media viewer 116 on client device 110. Once an event group is identified, all of the images within that event group are received by client device 110. An option may be received, enabling a user to download all of the images associated with an identified even group. In the previous example, the one or more images from each of the identified event groups including John Doe, Jane Doe, or a combination thereof will be received by the user. Thus, the user will be presented with access to photographs from each identified event group. The user will have access to images from the event in question, such as a wedding.

In another embodiment, a notification of the identified event groups may be received by client device 110, followed by an access link. The access link provides access to the collection of images. For example, an access link may be provided to a user as a link which may be accessed through browser 114 on client device 110. Upon clicking on the link, a user will be provided with a website in which they may view the images from the identified event groups.

According to an embodiment, the collection of images received for each of the identified event groups may be segmented based on the event group. For example, the collection of images may be segmented by client application 112 and/or media viewer 116 on client device 110. Each event group may correspond to a specific event. Upon receiving images for each event, as an event group, client application 112 or media viewer 116 may divide the images into albums based on the events. Thus, a user may view albums for different events.

In another embodiment, each of the images within an identified event group may be tagged with metadata information. For example, upon receiving a collection of images associated with an identified event group, all of the images may not be tagged properly. A user may choose to define tag information for each of the images within the event group. Such tag information may relate to the name or location of the event, or individuals who attended the event. Upon defining the tag information, each of the images with the event group will be tagged with the tag information.

Example Computer System Implementation

Aspects of the present disclosure shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
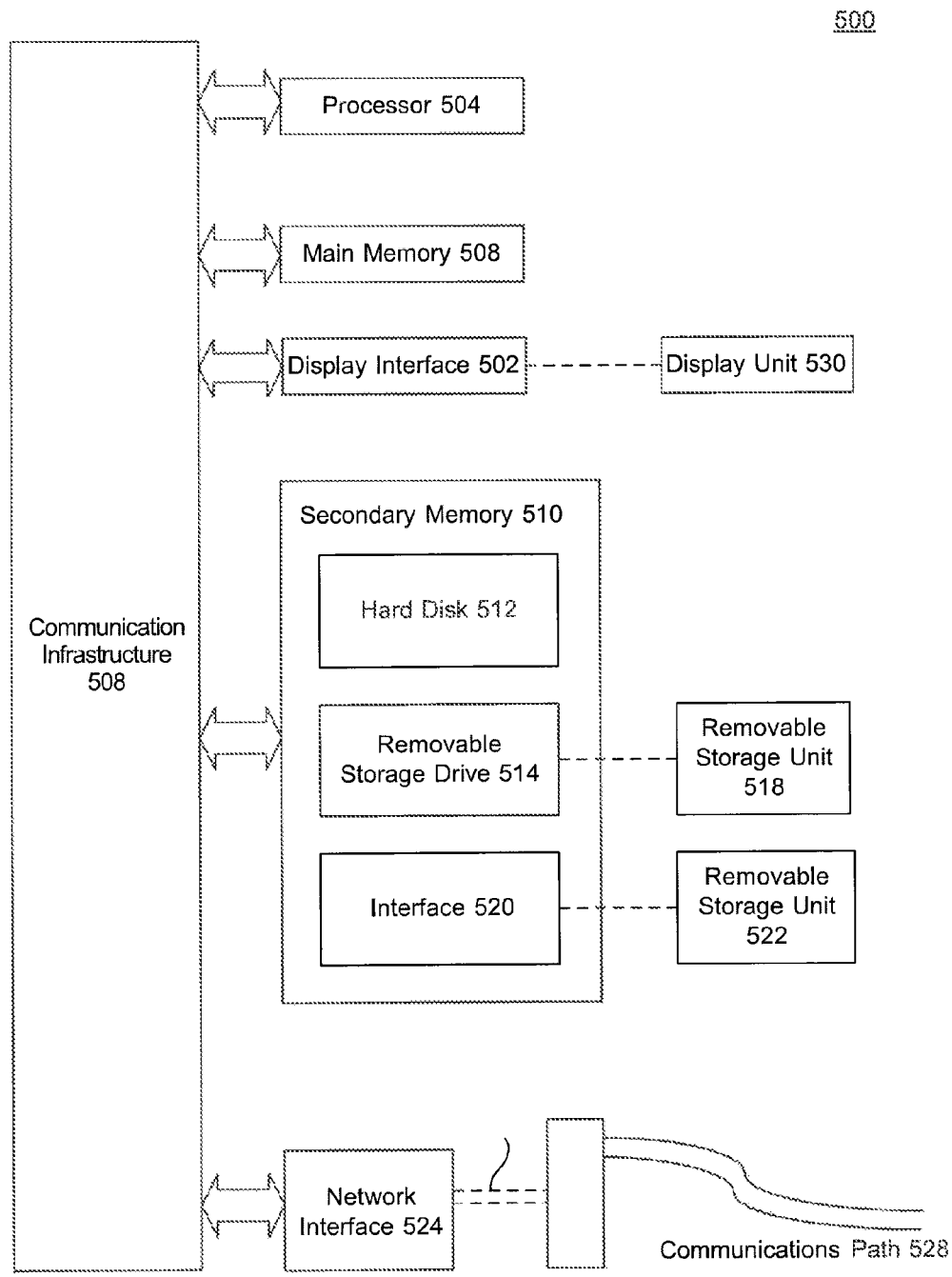
FIG. 5 is a diagram of an example of a computer system in which embodiments can be implemented.

FIG. 5 illustrates an example computer system 500 in which embodiments of the present disclosure, or portions thereof, may be implemented as computer-readable code. For example, server 102 and client device 110 of FIG. 1, can each be implemented in a computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the disclosure are described in terms of this example computer system 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present disclosure as discussed herein. In particular, the computer programs, when executed, enable processor device 504 to implement the processes of the present disclosure, such as the stages in the methods illustrated by flowchart 400 of FIG. 4, discussed above. Accordingly, such computer programs represent controllers of the computer system 500. Where an embodiment of the present disclosure is implemented using software, the software may be stored in a computer program product and loaded into computer system 500 using removable storage drive 514, interface 520, hard disk drive 512, or communications interface 524.

Embodiments of the disclosure also may be directed to computer program products comprising software stored on any computer useable medium. Such software, when executed in one or more data processing device, causes a data processing device(s) to operate as described herein. Embodiments of the disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer implemented method, comprising:
receiving, from a client device, a first set of data tags from a first user as a query to search for images relating to a first event, the query including a personal identity data tag and an event-related data tag, the personal identity data tag relating to identification information for an individual that attended the first event and the event-related data tag describing the first event;
receiving a face identity list and a separate event-specific feature list for a plurality of event groups, the face identity list aggregating a plurality of personal identity data tags and the separate event specific feature list aggregating a plurality of event-related data tags, the plurality of personal identity data tags and the plurality of event-related data tags being retrieved from a plurality of images associated with a plurality of events, and the plurality of images having been previously tagged;
matching the query with the face identity list and the separate event-specific feature list to identify a first event group from the plurality of event groups, wherein the first event group is a first collection of images associated with the first event, the first collection of images including one or more images tagged with a second set of data tags that match at least one of the personal identity data tag and the event-related data tag;
receiving metadata for the first event group, the metadata including geographical location and timestamp information added to an image file format of the one or more images in the first collection of images of the first event group;
segmenting the first event group into one or more albums based on the received metadata; and
transmitting instructions to the client device that cause display of the one or more albums to the first user.

2. The method of claim 1, wherein each of the one or more albums groups images having similar metadata.

3. The method of claim 1, wherein the face identity list includes the plurality of personal identity data tags for a plurality of individuals that attended the first event and the separate event-specific feature list includes the plurality of event-related data tags associated with the first event.

4. The method of claim 3, wherein the face identity list is populated based on facial detection and recognition of one or more faces within the first collection of images.

5. The method of claim 1, wherein the personal identity data tag is one of a first name or last name of an individual.

6. The method of claim 1,
wherein the event-related data tag includes information relating to a location where the first event took place, a landmark identifying the location of the first event, a time when the first event took place, and a date on which the first event took place.

7. The method of claim 1, wherein transmitting the instructions to the client device that cause the display of the one or more albums comprises:
transmitting the instructions for displaying a notification of the one or more albums to the first user; and
transmitting the instructions for displaying an access link in the notification, the access link providing access to the one or more albums.

8. The method of claim 1, further comprising:
tagging each image within the first event group with metadata information related to the first event.

9. A system comprising: one or more processors and a memory storing instructions that are operable, when executed by the one or more processors, to cause the one or more processors to perform operations comprising:
receiving a first set of data tags from a first user as a query to search for images relating to a first event, the query including a personal identity data tag and an event-related data tag, the personal identity data tag relating to identification information for an individual that attended the first event and the event-related data tag describing the first event;
receiving a face identity list and a separate event-specific feature list for a plurality of event groups, the face identity list aggregating a plurality of personal identity data tags and the separate event specific feature list aggregating a plurality of event-related data tags, the plurality of personal identity data tags and the plurality of event-related data tags being retrieved from a plurality of images associated with a plurality of events, and the plurality of images having been previously tagged;
matching the query with the face identity list and the separate event-specific feature list to identify a first event group from the plurality of event groups, wherein the first event group is a first collection of images associated with the first event, the first collection of images including one or more images tagged with a second set of data tags that match at least one of the personal identity data tag and the event-related data tag;
receiving metadata for the first event group, the metadata including geographical location and timestamp information added to an image file format of the one or more images in the first collection of images of the first event group;
segmenting the first event group into one or more albums based on the received metadata; and
displaying the one or more albums to the first user.

10. The system of claim 9, wherein each of the one or more albums groups images having similar metadata.

11. The system of claim 9, wherein the face identity list includes the plurality of personal identity data tags for a plurality of individuals that attended the first event and the separate event-specific feature list includes the plurality of event-related data tags associated with the first event.

12. The system of claim 11, wherein the face identity list is populated based on facial detection and recognition of one or more faces within the first collection of images.

13. The system of claim 9, wherein the personal identity data tag is one of a first name or last name of an individual.

14. The system of claim 9, wherein the event-related data tag includes information relating to a location where the first event took place, a landmark identifying the location of the first event, a time when the first event took place, and a date on which the first event took place.

15. The system of claim 9, wherein displaying the one or more albums further comprises:
displaying a notification of the one or more albums to the first user; and
displaying an access link in the notification, the access link providing access to the one or more albums.

16. The system of claim 9, wherein the operations further comprise:
tagging each image within the first event group with metadata information related to the first event.

17. A computer program product comprising a non-transitory computer readable medium storing a computer readable program, wherein the computer readable program when executed causes the computer to perform steps comprising:
receiving a first set of data tags from a first user as a query to search for images relating to a first event, the query including a personal identity data tag and an event-related data tag, the personal identity data tag relating to identification information for an individual that attended the first event and the event-related data tag describing the first event;
receiving a face identity list and a separate event-specific feature list for a plurality of event groups, the face identity list aggregating a plurality of personal identity data tags and the separate event specific feature list aggregating a plurality of event-related data tags, the plurality of personal identity data tags and the plurality of event-related data tags being retrieved from a plurality of images associated with a plurality of events, and the plurality of images having been previously tagged;
matching the query with the face identity list and the separate event-specific feature list to identify a first event group from the plurality of event groups, wherein the first event group is a first collection of images associated with the first event, the first collection of images including one or more images tagged with a second set of data tags that match at least one of the personal identity data tag and the event-related data tag;
receiving metadata for the first event group, the metadata including geographical location and timestamp information added to an image file format of the one or more images in the first collection of images of the first event group;
segmenting the first event group into one or more albums based on the received metadata; and
transmitting instructions that cause display of the one or more albums to the first user.

18. The computer program product of claim 17, wherein each of the one or more albums groups images having similar metadata.

19. The computer program product of claim 17, wherein the face identity list includes the plurality of personal identity data tags for a plurality of individuals that attended the first event and the separate event-specific feature list includes the plurality of event-related data tags associated with the first event.

20. The computer program product of claim 19, wherein the face identity list is populated based on facial detection and recognition of one or more faces within the first collection of images.

21. The computer program product of claim 17, wherein the personal identity data tag is one of a first name or last name of an individual.

22. The computer program product of claim 17, wherein the event-related data tag includes information relating to a location where the first event took place, a landmark identifying the location of the first event, a time when the first event took place, and a date on which the first event took place.

23. The computer program product of claim 17, wherein transmitting the instructions that cause the display of the one or more albums comprises:
   transmitting the instructions for displaying a notification of the one or more albums to the first user; and
   transmitting the instructions for displaying an access link in the notification, the access link providing access to the one or more albums.

24. The computer program product of claim 17, wherein the instructions cause the one or more computers to further perform:
   tagging each image within the first event group with metadata information related to the first event.

* * * * *